(12) United States Patent
Dane et al.

(10) Patent No.: US 8,879,001 B2
(45) Date of Patent: Nov. 4, 2014

(54) DETECTING BLOCK ARTIFACTS IN CODED IMAGES AND VIDEO

(75) Inventors: Gokce Dane, San Diego, CA (US); Cristina Gomila, Princeton, NJ (US)

(73) Assignee: Thomson Licensing, Boulogne-Billacourt (FR)

( * ) Notice: Subject to any disclaimer, the term of this patent is extended or adjusted under 35 U.S.C. 154(b) by 824 days.

(21) Appl. No.: 12/448,636

(22) PCT Filed: Dec. 21, 2007

(86) PCT No.: PCT/US2007/026213
§ 371 (c)(1),
(2), (4) Date: Jun. 26, 2009

(87) PCT Pub. No.: WO2008/085425
PCT Pub. Date: Jul. 17, 2008

(65) Prior Publication Data
US 2010/0033633 A1 Feb. 11, 2010

Related U.S. Application Data

(60) Provisional application No. 60/877,549, filed on Dec. 28, 2006.

(51) Int. Cl.
| | | |
|---|---|---|
| *H04N 11/02* | (2006.01) | |
| *H04N 19/48* | (2014.01) | |
| *H04N 19/86* | (2014.01) | |
| *H04N 19/154* | (2014.01) | |
| *H04N 19/119* | (2014.01) | |
| *H04N 19/18* | (2014.01) | |
| *H04N 19/176* | (2014.01) | |
| *H04N 19/182* | (2014.01) | |

(52) U.S. Cl.
CPC ... *H04N 19/00563* (2013.01); *H04N 19/00915* (2013.01); *H04N 19/002* (2013.01); *H04N 19/00072* (2013.01); *H04N 19/00296* (2013.01); *H04N 19/00278* (2013.01); *H04N 19/00909* (2013.01); *H04N 19/00303* (2013.01)
USPC .......................................................... 348/625

(58) Field of Classification Search
CPC ................................................. H04N 19/00915
USPC ................................................................ 348/625
See application file for complete search history.

(56) References Cited

U.S. PATENT DOCUMENTS 5,367,385 A * 11/1994 Yuan ............................. 358/465
5,454,051 A * 9/1995 Smith ........................... 382/233

(Continued)

FOREIGN PATENT DOCUMENTS

| EP | 1659798 | 5/2006 |
| GB | 2329090 | 3/1999 |
| WO | WO2004049243 | 6/2004 |

OTHER PUBLICATIONS

An Efficient Approach for Implementation of Deblocking on Vector Processors in the H.264 Decoder (Jul. 14, 2005).*

(Continued)

*Primary Examiner* — William C Vaughn, Jr.
*Assistant Examiner* — Luis M Perez
(74) *Attorney, Agent, or Firm* — Robert D. Shedd; Paul P. Kiel; Xiaoan Lu

(57) ABSTRACT

A method is provided for block artifact detection and block artifact determination using multiple features in coded images and video. A method includes identifying a plurality of overlapping blocks in a picture with respect to a current block. Each of the plurality of overlapping blocks covers a portion of the current block and a portion of an adjacent block. The method further includes transforming at least one of the plurality of overlapping blocks into respective coefficients corresponding to at least one of a luminance component and a chrominance component. The method also includes identifying a block artifact for the at least one of the plurality of overlapping blocks when coefficients corresponding to the at least one of the plurality of overlapping blocks are larger than a predefined value.

22 Claims, 13 Drawing Sheets

(56) References Cited

U.S. PATENT DOCUMENTS

| | | | |
|---|---|---|---|
| 5,737,451 A * | 4/1998 | Gandhi et al. ............... 382/268 |
| 5,850,294 A * | 12/1998 | Apostolopoulos et al. ............... 358/426.14 |
| 5,887,084 A * | 3/1999 | Wober et al. ............... 382/250 |
| 5,920,356 A * | 7/1999 | Gupta et al. ............... 348/606 |
| 6,151,420 A * | 11/2000 | Wober et al. ............... 382/275 |
| 6,317,522 B1 * | 11/2001 | Rackett ............... 382/268 |
| 6,728,414 B1 * | 4/2004 | Chang et al. ............... 382/254 |
| 6,741,752 B1 | 5/2004 | Yang et al. |
| 6,950,473 B2 * | 9/2005 | Kim et al. ............... 375/240.29 |
| 6,968,006 B1 | 11/2005 | Puri et al. |
| 7,003,174 B2 * | 2/2006 | Kryukov et al. ............... 382/266 |
| 7,403,665 B2 * | 7/2008 | Zhang ............... 382/244 |
| 7,545,988 B2 * | 6/2009 | Meeker ............... 382/232 |
| 7,567,619 B2 * | 7/2009 | Varma et al. ............... 375/240.24 |
| 7,792,385 B2 * | 9/2010 | Kwan et al. ............... 382/268 |
| 8,218,634 B2 * | 7/2012 | Guleryuz ............... 375/240.16 |
| 8,542,751 B2 * | 9/2013 | Ahuja et al. ............... 375/240.29 |
| 2003/0053708 A1 * | 3/2003 | Kryukov et al. ............... 382/261 |
| 2003/0072377 A1 | 4/2003 | Ruol et al. |
| 2004/0013315 A1 * | 1/2004 | Li et al. ............... 382/268 |
| 2006/0245501 A1 | 11/2006 | Gordon et al. |
| 2006/0268980 A1 | 11/2006 | Le et al. |
| 2008/0019605 A1 * | 1/2008 | Yea et al. ............... 382/261 |
| 2010/0033633 A1 * | 2/2010 | Dane et al. ............... 348/625 |
| 2011/0075037 A1 * | 3/2011 | Jalil et al. ............... 348/607 |

OTHER PUBLICATIONS

Liu et al.:"Efficient DCT-Domain Blind Measurement and Reduction of Blocking Artifacts", IEEE Transactions on Circuits and Systems for Video Technology, vol. 12, No. 12, Dec. 2002, pp. 1139-1149, XP0011071905.

Tan et al.:"Measuring blocking Artefacts using Harmonic Analysis", Electronics Letters, Aug. 5, 1999, vol. 35, No. 16, XP006012504.

Kong et al.:"Coding Artifacts Reduction Using Edge Map Guided Adaptive and Fuzzy Filtering", 2004 IEEE International Conference on Multimedia and Expo (ICME), pp. 1135-1138, XP0010771024.

Chan et al.:"A Psychovisually-Based Image Quality Evaluator for JPEG Images", 2000 IEEE, pp. 1541-1546.

Minami et al.:"An Optimization Approach for Removing Blocking Effects in Transform Coding", IEEE Transactions on Circuits and Systems for Video Technology, vol. 5, No. 2, Apr. 1995, pp. 74-82.

Wu et al:"A Generalized Block-Edge Impairment Metric for Video Coding", IEEE Signal Processing Letters, vol. 4, No. 11, Nov. 1997, pp. 317-320.

Fenimore et al.:"Mosquito noise in MPEG-Compressed Video: Test Patterns and Metrics", Electricity Division, National Institute of Standards, Technology Administration, US Department of Commerce.

List et al.:"Adaptive Deblocking Filter", IEEE Transactions on Circuits and Systems for Video Technology, vol. 13, No. 7, Jul. 2003, pp. 614-619.

ITU-T Telecommunication Standardization Sector of ITU, "Advanced Video Coding for Generic Audiovisual Services", Telecommunication Standardization Sector of ITU, H.264, Mar. 2005, pp. I-325.

Karunasekera et al.:"A Distortion Measure for Blocking Artifacts in Images Based on Human Visual Sensitivity", IEEE Transactions on Image Processing, vol. 4. No. 6, Jun. 1995. pages 713-724.

"Information Technology—Generic Coding of Moving Pictures and Associated Audio Information: Systems", International Standard, ISO/IEC 13818-1, Third edition Oct. 15, 2007.

Pan et al.:"A Locally-Adaptive Algorithm for Measuring Blocking Artifacts in Images and Videos", IEEEE, ICAS 2004, XP0010719411, pp. III-925-III-928.

Interntional Search Report Dated Nov. 26, 2008.

* cited by examiner

DETECTING BLOCK ARTIFACTS IN CODED IMAGES AND VIDEO

This application claims the benefit, under 35 U.S.C. §365 of International Application PCT/US07/26213 and filed Dec. 21, 2007, which was published in accordance with PCT Article 21(2) on Jul. 17, 2008, in English and which claims the benefit of U.S. Provisional Patent Application No. 60/877,549, filed on Dec. 28, 2006, in English.

This application claims priority under 35 U.S.C. 119(e) to U.S. Provisional Patent Application Ser. No. 60/877,549, filed 28 Dec. 2006,

TECHNICAL FIELD

The present principles relate generally to image and/or video processing and, more particularly, for detecting block artifacts in coded images and video.

BACKGROUND

Image or video compression artifacts are introduced by digital image or video compression algorithms as a result of inappropriate distribution of available bits. Block artifacts, which are one of the most annoying compression artifacts, are perceived as unwanted discontinuities at the block boundaries of compressed pictures. Block artifacts become particularly more visible with high definition formats and high resolution displays. The manual determination by an operator of the locations of artifacts as part of a re-encoding process is not feasible in many image and video coding applications as a process can be expensive because of the amount of time required for finding such block artifacts. Therefore, it is necessary to perform automatic block artifact detection and reduce the blocky appearance in compressed pictures.

Once block artifacts are detected in a particular picture, post-processing algorithms or re-encoding with new encoding parameters can be applied to the picture in order to correct the blocky appearance of the picture. The post-processing or re-encoding algorithms can make fine adjustments to encoding parameters based on detected block artifact locations in order to get better picture quality. The strength of a block artifact is another important aspect of artifact detection which can guide the post-processing or re-encoding algorithms to fine tune their parameters to further improve the picture quality.

In some applications which perform automatic artifact correction in compressed video sequences with limited bit-rate constraints, the optional step can be performed of having an overall blockiness artifact metric per picture in order for the video encoder to decide which pictures to re-encode with the available bits. That is, some encoded pictures will have more block artifacts than other encoded pictures. Hence, the blockiness artifact metric is a standard way of measuring the blockiness of respective encoded pictures against each other.

Consequently, there is a need for algorithms that automatically detect block artifacts and determine the strength of the artifact per block and per picture.

Various prior art approaches have been proposed for detecting block artifact and for correcting such artifacts in low to high bit rate images using various video correction techniques. Few of these prior art approaches however only focus on artifact detection and metric determination. Furthermore, the prior art approaches appear to not address the problem of block artifact detection for pictures or video compression methods that make use of respectively high bit-rates.

In a first prior art approach, a block artifact metric determination algorithm is proposed. The first prior art approach compares the mean of the pixel values in a macroblock with the mean of its neighboring macroblocks. The individual differences are summed to obtain an overall blockiness metric. A simple edge detector is applied to exclude real edges from artifacts. A second prior art approach proposes an artifact detection metric that uses pixel values at the block boundaries. The two consecutive pixel values in two sides of the block boundary are filtered and the filtered value is summed to obtain an overall blockiness metric. In a third prior art approach, a block artifact metric is proposed which works on the luminance values of the images. The third prior art approach is similar to the first prior art approach in the sense that it computes and compares the mean values of blocks, with the exception that only those blocks with constant intensity are considered.

The first, second, and third prior art approaches do not consider perceptual factors and other properties of compressed images and video and, therefore, are not directly applicable to high resolution displays. The first, second, and third prior art approaches are mainly tested with video or image content compressed with low-to-medium bit rates. High definition video compression requires higher quality and higher bit rates. Even the smallest artifacts which are not visible in smaller displays such as cell phones or personal computer monitors are visible in high resolution displays.

A fourth and a fifth prior art approach consider perceptual factors. In the fourth prior art approach, a block metric is derived by considering the sum of the pixel differences at the block boundaries, where the differences are weighted by the pixel intensities. Gray values between 70 and 90 (in an 8 bit gray scale image, for example) are weighted more than dark and bright pixels. In the fifth prior art approach, a block artifact detection scheme is proposed that considers some perceptual factors. In particular, the background luminance and background activity are used as perceptual features which affect the visibility of the artifacts. In order to derive the perceptual model parameters, visual experiments are performed. Images including edges with different lengths and amplitudes with different backgrounds are shown to human subjects and the visibility of the edge patterns are determined based upon the visual perception of such subjects. Based on the subjective results, perceptual parameters that mask the artifacts are found. Some of the perceptual features used in the fifth prior art approach are useful such as background activity, and some of them are interesting but highly complex such as a frequency domain processing to obtain the perceptual parameters that incorporated into a video encoding process.

An in-loop de-blocking filter is another tool for suppressing block artifacts in video compression applications based on the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"). The in-loop de-blocking filter is proposed both for artifact detection and correction. The filtering is adaptive to the blockiness strength which is determined by compressed domain information. The filtering smoothes over the reconstructed pixels near the block boundaries. However in very-high bit rate encoding of high-resolution content, the spatial details which we would like to preserve are lost or blurred when the de-blocking filter is turned on.

Thus, in the prior art, the problem of detecting block artifacts is not completely addressed and/or considered with respect to the properties of high definition content and various corresponding perceptual features.

SUMMARY

These and other drawbacks and disadvantages of the prior art are addressed by the present principles, which are directed to methods and apparatus for detecting block artifacts and block artifact metric determination using multiple features in coded images and video.

According to an aspect of the present principles, there is provided a method for detecting block artifacts. The method includes identifying a plurality of overlapping blocks in a picture with respect to a current block. Each of the plurality of overlapping blocks covers a portion of the current block and a portion of an adjacent block. The method further includes transforming at least one of the plurality of overlapping blocks into respective coefficients corresponding to at least one of a luminance component and a chrominance component. The method also includes identifying a block artifact for the at least one of the plurality of overlapping blocks when coefficients corresponding to the at least one of the plurality of overlapping blocks are larger than a predefined value.

According to another aspect of the present principles, there is provided an apparatus for detecting block artifacts. The apparatus includes a block artifact detector for identifying a plurality of overlapping blocks in a picture with respect to a current block. Each of the plurality of overlapping blocks covers a portion of the current block and a portion of an adjacent block. The block artifact detector transforms at least one of the plurality of overlapping blocks into respective coefficients corresponding to at least one of a luminance component and a chrominance component, and identifies a block artifact for the at least one of the plurality of overlapping blocks when coefficients corresponding to the at least one of the plurality of overlapping blocks are larger than a predefined value.

According to yet another aspect of the present principles of the invention, there is provided a method for detecting block artifacts. The method includes deriving a block boundary line blockiness value for at least one line of pixels in at least one block boundary in a picture by filtering a difference of pixel values at two sides of the particular block boundary and a difference at the particular block boundary and combining the difference of the pixel values at the two sides and the difference at the particular block boundary. The method further includes deriving a block boundary blockiness value by combining of at least one block boundary line blockiness value measured on a particular one of the at least one block boundary. The method also includes deriving a block blockiness value by combining at least one block boundary blockiness value.

According to still another aspect of the present principles of the invention, there is provided an apparatus for detecting block artifacts. The apparatus includes a block artifact detector for deriving a block boundary line blockiness value for at least one line of pixels in at least one block boundary in a picture by filtering a difference of pixel values at two sides of the particular block boundary and a difference at the particular block boundary and combining the difference of the pixel values at the two sides and the difference at the particular block boundary. The block artifact detector derives a block boundary blockiness value by combining of at least one block boundary line blockiness value measured on a particular one of the at least one block boundary, and derives a block blockiness value by combining at least one block boundary blockiness value.

These and other aspects, features and advantages of the present principles will become apparent from the following detailed description of exemplary embodiments, which is to be read in connection with the accompanying drawings.

BRIEF DESCRIPTION OF THE DRAWINGS

The present principles can be better understood in accordance with the following exemplary figures, in which.

DETAILED DESCRIPTION

Figure 1:
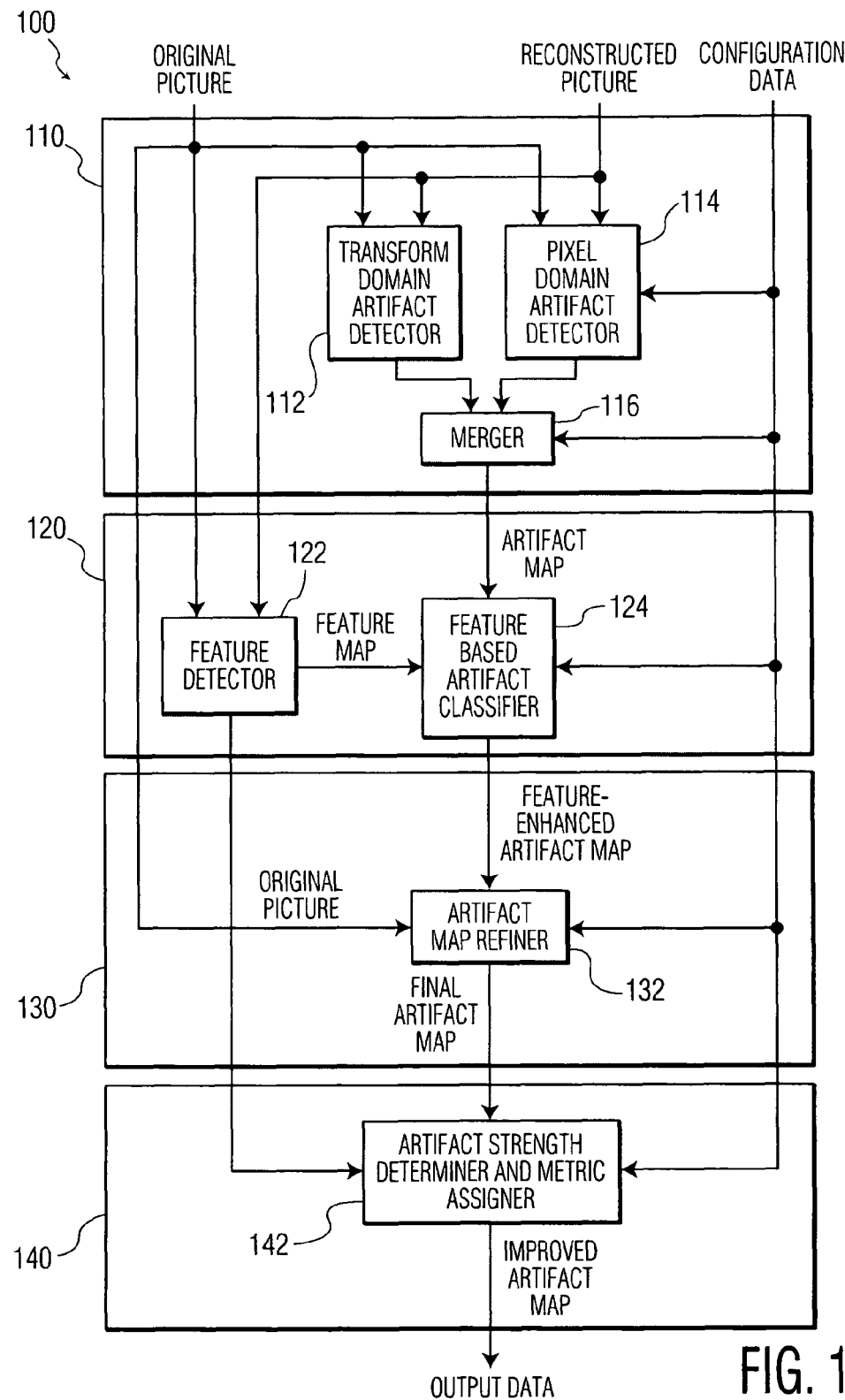
FIG. 1 is a block diagram for an exemplary system for blockiness detection, in accordance with an embodiment of the present principles.

The present principles are directed to methods and apparatus for detecting block artifacts and for determining block artifact metrics using multiple features in coded images and video.

The present description illustrates the present principles. It will thus be appreciated that those skilled in the art will be able to devise various arrangements that, although not explicitly described or shown herein, embody the present principles described herein to such arrangements.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, can be utilized with respect to other video coding standards, recommendations, and extensions thereof, including extensions of the MPEG-4 AVC standard, while maintaining the spirit of the present principles.

Moreover, within the text of the specification the terms "picture", "image", and "frame" are used. It is to be understood within the usage of such terms in this specification and the claims that the terms are synonymous with each other and represent image data associated with a sequence of moving video pictures. It is understood that different video encoding standards can assign different meaning to picture, image, and frame, but for purposes of this specification such definitions are not to limit these terms in any way.

In accordance with one or more embodiments of the present principles, we propose methods and apparatus for at least the following: (1) automatic detection of block artifacts; (2) artifact strength assignment per block; and (3) artifact metric determination per picture. It is to be appreciated that these methods could be used together as a part of complete blockiness detection system or as components in other systems.

Turning to FIG. 1, an exemplary system for blockiness detection is indicated generally by the reference numeral 100.

The system 100 includes a block artifact detector 110, a feature based artifact classifier 120, an original picture based artifact refiner 130, and an artifact strength determination and metric assigner 140.

The block artifact detector 110 includes a transform domain artifact detector 112, a pixel domain artifact detector 114, and a merger 116.

The feature based artifact classifier 120 includes a feature detector 122 and a feature based artifact classifier 124.

The original picture based artifact refiner 130 includes an artifact map refiner 132.

The artifact strength determination and metric assigner 140 includes an artifact strength determiner and metric assigner 142.

An output of the transform domain artifact detector 112 is connected in signal communication with a first input of the merger 116. An output of the pixel domain artifact detector 114 is connected in signal communication with a second input of the merger 116. An output of the merger 116 is connected in signal communication with a second input of the feature based artifact classifier 124.

An output of the feature based artifact classifier 124 is connected in signal communication with a second input of the artifact map refiner 132. A first output of the feature detector 122 is connected in signal communication with a first input of the feature based artifact classifier 124. A second output of the feature detector 122 is connected in signal communication with a first input of the artifact strength determiner and metric assigner 142.

An output of artifact map refiner 132 is connected in signal communication with a second input of the artifact strength determiner and metric assigner 142

Respective first inputs of the transform domain artifact detector 112, the pixel domain artifact detector 114, the feature detector 122, and the artifact map refiner 132 are available as inputs of the system 100, for receiving an original picture.

Respective second inputs of the transform domain artifact detector 112, the pixel domain artifact detector 114, and the feature detector 122 are available as inputs of the system 100, for receiving a reconstructed picture.

Respective third inputs of the pixel domain artifact detector 114, the merger 116, the feature based artifact classifier 124, the artifact map refiner 132, and the artifact strength determiner and metric assigner 142 are available as inputs of the system 100, for receiving configuration data.

An output of the artifact strength determiner and metric assigner 142 is available as an output of the system 100, for outputting output data.

It is to be appreciated that while some elements shown in FIG. 1 are so shown and described with respect to two or more functions, it is to be appreciated that such elements can be respectively implemented by one or more elements instead of a single element, with the corresponding functions respectively performed by the one or more elements instead of the single element. Given the teachings of the present principles provided herein, these and variations and implementations of the present principles are readily contemplated by one of ordinary skill in this and related arts, while maintaining the spirit of the present principles.

Figure 2:
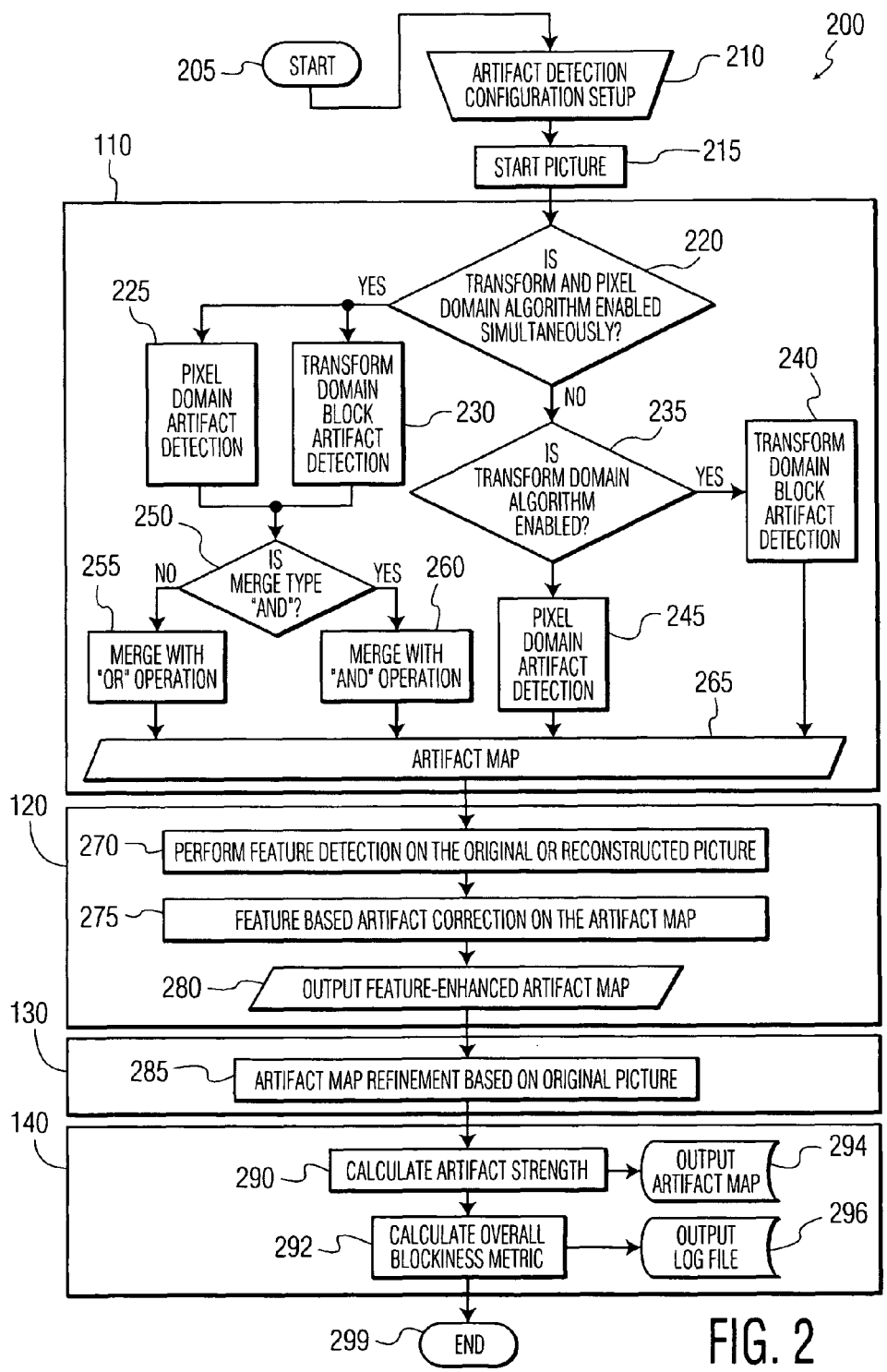
FIG. 2 is a flow diagram for an exemplary method for detecting block artifact, in accordance with an embodiment of the present principles.

Turning to FIG. 2, an exemplary method for detecting block artifacts is indicated generally by the reference numeral 200.

The method 200 includes a start block 205 that passes control to a function block 210. The function block 210 performs artifact detection configuration setup, and passes control to a function block 215. The function block 215 starts processing a current picture, and passes control to a decision block 220. The decision block 220 determines whether or not a transform algorithm and a pixel domain algorithm are simultaneously enabled. If so, the control is passed to both a function block 225 and a function block 230.

The function block 225 performs pixel domain artifact detection, and passes control to a decision block 250.

The function block 230 performs transform domain block artifact detection, and passes control to the decision block 250.

The decision block 250 determines whether or not the merge type is equal to "and". If so, the control is passed to a function block 260. Otherwise, control is passed to a function block 255.

The function block 260 merges using the "and" operation, and passes control to a function block 265.

The function block 255 mergers using the "or" operation, and passes control to the function block 265.

The function block 265 generates an artifact map, and passes control to a function block 270. The function block 270 performs feature detection on the original or reconstructed picture, and passes control to a function block 275. The function block 275 performs feature based artifact correction on the artifact map, and passes control to a function block 280.

The function block 280 generates a feature-enhanced artifact map, and passes control to a function block 285. The function block 285 performs artifact map refinement based on the original picture, and passes control to a function block 290.

The function block 290 calculates artifact strength, and passes control to a function block 294 and a function block 292.

The function block 294 outputs an artifact map.

The function block 292 calculates an overall blockiness metric, and passes control to a function block 296 and an end block 299.

The function block 296 outputs a log file.

The decision block 235 determines whether or not the transform domain algorithm is enabled. If so, then control is passed to a function block 240. Otherwise, control is passed to a function block 245.

The function block 240 performs transform domain block artifact detection, and passes control to the function block 265.

The function block 245 performs pixel domain artifact detection, and passes control to the function block 265.

In the method 200, blocks 220, 225, 230, 235, 240, 245, 250, 255, 260, and 265 correspond to the block artifact detector 110 of FIG. 1. Blocks 270, 275, and 280 correspond to the feature based artifact classifier 120 of FIG. 1. Block 285 corresponds to the original picture based artifact refiner 130 of FIG. 1. Blocks 290, 292, 294, and 296 correspond to the artifact strength determination and metric assigner 140 of FIG. 1.

In accordance with an embodiment of the present principles, the original and the reconstructed picture are used as input. Either luma and/or chroma values of input pictures can be used for artifact detection. The original picture is used to eliminate false artifact detection, such as possible detection of actual edges in the image. The original picture is also used to extract some information that determines the visibility of the artifact. In scenarios where the original picture is not available, the reconstructed picture can also be used to extract information. In addition to original and reconstructed images, configuration data can also be used as an input. The configuration data includes parameters such as thresholds for pixel and transform domain artifact detection both for an original and a reconstructed video source and other parameters that specify the type of features that can be used for improving the artifact detection.

In accordance with an embodiment of the present principles, the following two types of outputs are used: (1) a block artifact metric for the whole picture, and (2) an artifact location map that includes the information such as, for example, the location of blocks and the strengths of block artifacts.

Method and Apparatus for Blockiness Detection

In accordance with an embodiment, two exemplary algorithms are proposed for the preliminary block artifact detection, namely one in the transform domain and one in the pixel domain. The two algorithms can be used individually for different content types or simultaneously where the output of each algorithm is merged to create a combined blockiness map. The algorithm type is specified by the input configuration data. If two algorithms are specified to be used simultaneously, a merging process including, but not limited to, an "and" or an "or" operation can be used to find the artifact map.

Detecting Block Artifacts in the Transform Domain

Figure 3A:
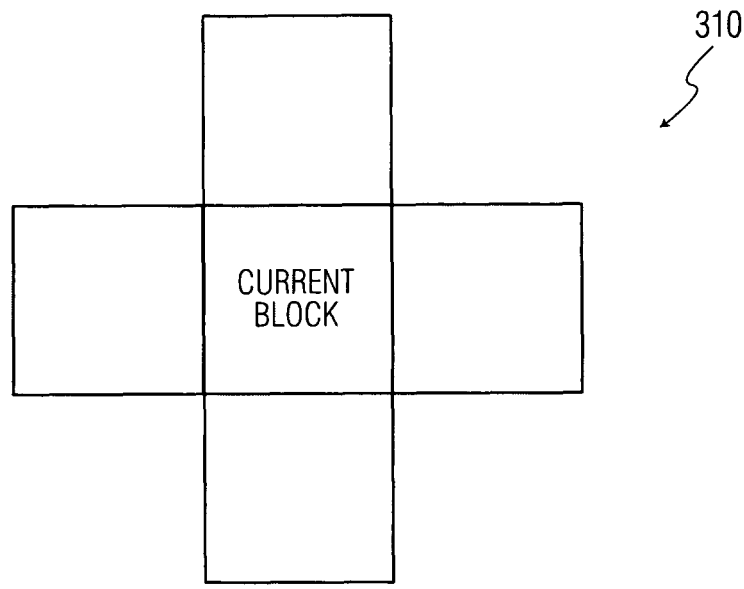
FIGS. 3A-3D are diagrams for examples of overlapped blocks, in accordance with an embodiment of the present principles.
Figure 3B:
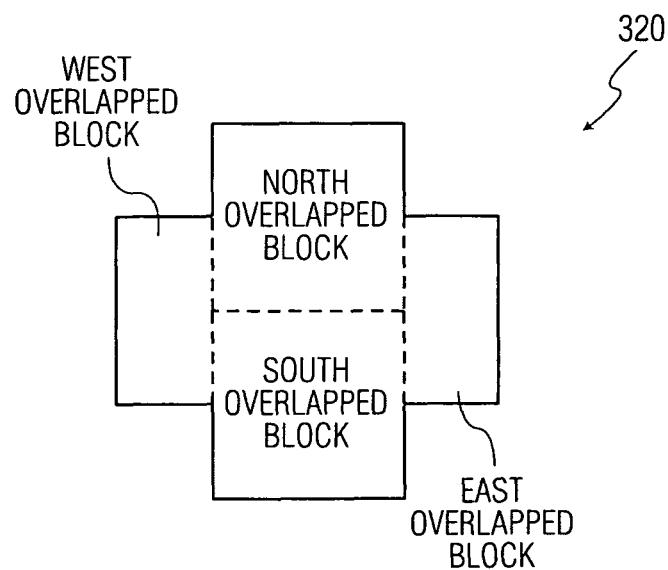

The proposed transform domain algorithm finds the block artifacts by analyzing the transform coefficients of either luma or chroma blocks using a novel thresholding approach with respect to, for example, the first 3 AC coefficients. The blocks can be one of the 4-neighbors of the current block that is being processed. We refer to this block which is formed considering the boundary of two neighboring blocks as an "overlapped block". Turning to FIGS. 3A-3D, respective examples of overlapped blocks are indicated generally by the reference numerals 310, 320, 330, and 340. In particular FIG. 3A shows a block and its 4-neighbors. FIG. 3B shows the North and South overlapped blocks. For example, the North overlapped block is formed by combining the North half of the current block and the South half of its North neighbor.

Figure 3C:
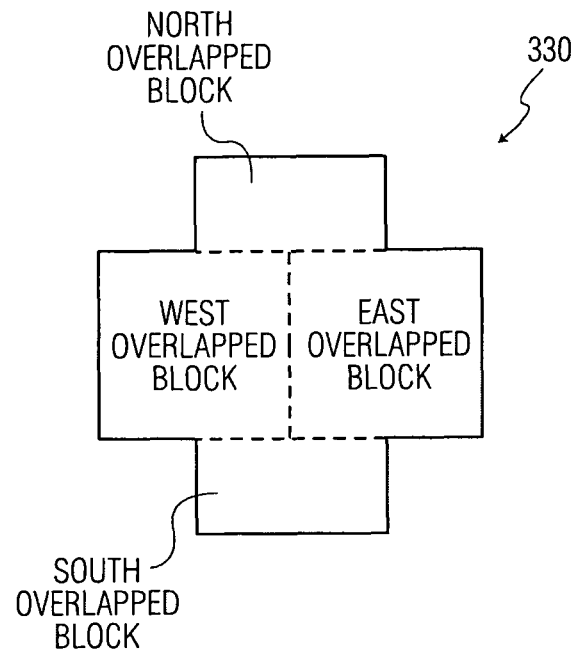
Figure 3D:
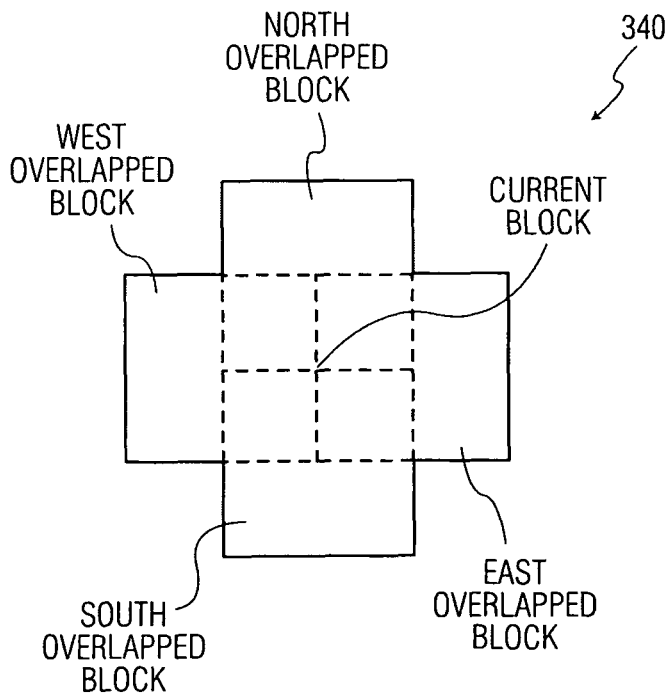
Figure 4:
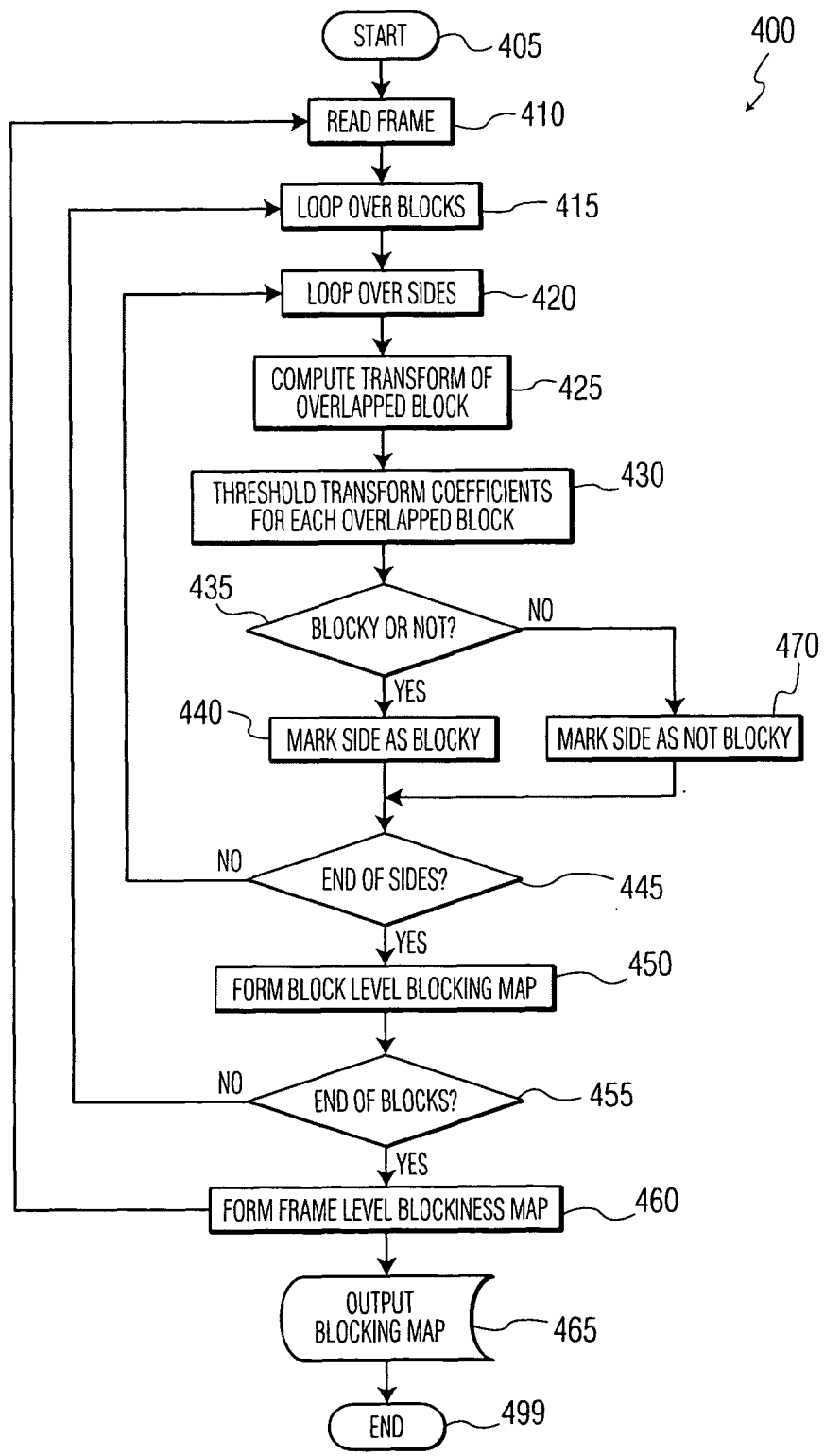
FIG. 4 is a flow diagram for a method for detecting block artifacts in the transform domain, in accordance with an embodiment of the present principles.

FIG. 3C shows examples of East and West overlapped blocks.
FIG. 4 shows examples of East, West, North, and South overlapped blocks.

After forming the overlapped blocks, transforms of each overlapped block are computed. If a block artifact exists in a particular side of the current block, certain transform coefficients of the overlapped block belonging to that particular side will be larger. In a particular embodiment, we propose to use the first two AC transform coefficients of the transform array in zig-zag scan order to determine the block artifact. The transform could be a Discrete Cosine Transform (DCT) or a Hadamard transform. It is to be appreciated that the present principles are not limited to any particular type of DCT and, thus, different versions of DCT such as integer-DCT or floating point-DCT can be used. The following example shows the computation of the transform coefficients when using a DCT transform of an 8×8 image block. Although the example is given for 8×8, it is to be appreciated that the present principles are not limited to solely DCT transforms of 8×8 image blocks and, thus, different block sizes including, but not limited to, 4×4 or 16×16 can also be used in accordance with the present principles.

The 2-dimensional DCT transform of an 8×8 image block is defined as follows:

$$F_{uv} = \frac{C_u C_v}{4} \sum_{i=0}^{7} \sum_{j=0}^{7} \cos\frac{(2i+1)u\pi}{16} \cos\frac{(2j+1)v\pi}{16} f(i,j) \quad (1)$$

where $$C_u, C_v = \begin{cases} \frac{1}{\sqrt{2}} & \text{for } u, v = 0 \\ 1 & \text{otherwise} \end{cases} \quad (2)$$

In the above equations, transform coefficients are represented by $F_{uv}$. For example, $F_{00}$ represents the average luminance value of the image block. $F_{10}$ and $F_{01}$ represent information regarding the intensity difference in horizontal and vertical directions of an image block respectively. Therefore, if an image has a block artifact (e.g., strong intensity difference) in North or South directions, then $F_{01}$ has a larger value. Similarly, if the block artifact occurs in East or West directions, then $F_{10}$ has a larger value.

In addition to block boundaries, block artifacts can also occur within the block itself. To find the block artifacts within the block, the third AC transform coefficient ($F_{11}$) in zig-zag scan order could be used to determine block artifacts.

The transform coefficients $F_{01}$, $F_{10}$, and $F_{11}$ are compared with thresholds and the block is declared as having an artifact if the coefficients are larger than the thresholds. The thresholds can be adjusted depending on the application. The thresholds can also be adjusted based on the direction of the artifact that we would like to detect such as artifacts occurring in the North boundary of the block alone, artifacts occurring in the East boundary of the block and within the block simultaneously to name a few examples.

Turning to FIG. 4, a method for block artifact detection in the transform domain is indicated generally by the reference numeral 400.

The method 400 includes a start block 405 that passes control to a function block 410. The function block 410 reads a frame, and passes control to a function block 415. The function block 415 loops over blocks, and passes control to a function block 420. The function block 420 loops over sides, and passes control to a function block 425. The function block 425 computes a transform of the overlapped block, and passes control to a function block 430. The function block 430 determines threshold transform coefficients for each overlapped block, and passes control to a decision block 435. The decision block 435 determines whether or not the current side is block. If so, then control is passed to a function block 440. Otherwise, control is passed to a function block 470.

The function block 440 marks the current side as blocky, and passes control to a decision block 445. The decision block 445 determines whether or not the end of the sides of the current block has been reached (i.e., all or a pre-designated set of sides have been processed). If so, then control is passed to a function block 450. Otherwise, control is returned to the function block 420.

The function block 450 forms a block level blocking map, and passes control to a decision block 455. The decision block 455 determines whether or not the end of blocks has been reaches (i.e., all or a pre-designated set of blocks have been processed). If so, then control is passed to a function block 460. Otherwise, control is returned to the function block 415.

The function block 460 forms a frame level blockiness map, and returns control to the function block 410 and also passes control to a function block 465. The function block 465 outputs the block map (formed by function block 460), and passes control to an end block 499.

In an embodiment, the artifact map obtained from the transform domain artifact detection algorithm can be further refined using perceptual features.

Detecting Block Artifacts in the Pixel Domain

Figure 5:
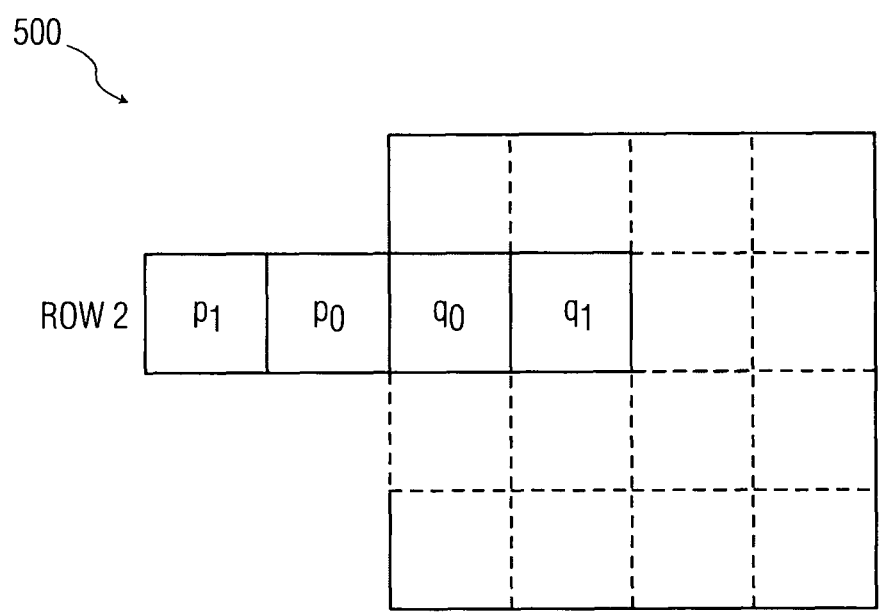
FIG. 5 is a diagram for an example of a block boundary in a vertical direction, in accordance with an embodiment of the present principles.

In an embodiment, the proposed pixel domain algorithm finds the block artifacts by analyzing the pixel values at the block boundaries either in luma or chroma components. The difference of pixel values at two sides of the block boundary and the difference at the block boundary are filtered and the filtered values of pixels along the boundary are summed using, for example, an adjusted sum method. Turning to FIG. 5, an example of a block boundary in a vertical direction is indicated generally by the reference numeral 500. In particular, FIG. 5 shows an example of a 4×4 image block and 2 pixels from row 2 of the West block boundary. In this example, $p_1$, $p_0$, $q_0$, and $q_1$ are pixel values at two sides of the boundary. There are 4 rows in the image block, so there are 4 sets of pixels (i.e., $p_1$, $p_0$, $q_0$, and $q_1$'s) for each row. For different block sizes, the number of rows will also be different.

The square of filtered pixel differences for each row of the West boundary is denoted by $\Delta_{Wi}$. $\Delta_{Wi}$ is found using the following:

$$\Delta_{Wi} = (\alpha_1(p_1-p_0)+\alpha_2(q_1-q_0)+\alpha_3(p_0-q_0))^2 \quad (3)$$

It is to be noted that Equation (3) can also be written as follows:

$$\Delta_{Wi} = (f_1 p_1 + f_2 p_0 + f_3 q_0 + f_4 q_1)^2 \quad (4)$$

where, $[f_1 f_2 f_3 f_4]$ are the filter coefficients. For example $$\left[\frac{1}{4} \quad -\frac{3}{4} \quad \frac{3}{4} \quad -\frac{1}{4}\right]$$

proposed in the second prior art method can be used as a filter. Of course, the present principles are not limited solely to the preceding filter and, thus, other filters can also be used to find $\Delta_{Ei}$. Equations (3), (4) and (5) can be easily extended to find the blockiness in other directions such as East, North and South in addition to West.

To find the blockiness measure at one side of the block, the filtered pixel values are summed, for example, using adjusted sum. The proposed adjusted sum alleviates false detections due to noise pixels or film grain. In an embodiment, the adjusted sum is novelly defined as follows:

$$\Delta_E = \sum_{\substack{i=1 \\ i \neq j,k}}^{N} (f_1 p_1 + f_2 p_0 + f_3 q_0 + f_4 q_1)^2 \quad (5)$$

where j and k are the row numbers of min and max pixel difference, i.e., novelly represented as follows:

$$j = \text{Index}(\min(\Delta_i)) \text{ for } i \in [0,N] \quad (6)$$

$$k = \text{Index}(\max(\Delta_i)) \text{ for } i \in [0,N] \quad (7)$$

In an embodiment, the adjusted sum can disregard only the maximum filtered pixel difference. In another embodiment, the adjusted sum can disregard two maximum filtered differences. Of course, different combinations of adjusted sum are also possible, while maintaining the spirit of the present principles.

The same calculation is performed for each side (i.e., North, South, East, and West boundaries), the obtained sum is thresholded, and artifacts are detected if the sum is larger than the thresholds.

In another embodiment, noise filtering such as, but not limited to, median filtering, can be used for noise removal and the pixel based artifact detection algorithm can be applied on the noise-filtered picture.

Merging Blockiness Maps that are Obtained by Different Algorithms

The transform-domain and pixel domain algorithms have different advantages. They can be either used independently or they can be combined and used simultaneously. Different merging techniques can be used to combine the block artifact maps obtained by the two algorithms. In one embodiment, the two binary artifact maps can be generated using lower thresholds and they can be merged by an "AND" operation. In another embodiment, the two binary artifact maps can be generated by using higher thresholds and they can be merged by an "OR" operation. Of course, the present principles are not limited solely to the preceding threshold and merging combinations and, thus, different threshold and merging combinations can also be used, while maintaining the spirit of the present principles. Changing the artifact detection thresholds according to the specific merging operation can help to obtain a more reliable blockiness artifact map.

Feature-Based Blockiness Artifact Classifier

The results obtained by the previous described methods could be further enhanced by using a feature-based blockiness artifact classifier. In an embodiment, this enhanced method relies on the computation of various perceptual features in the image including, but not limited to, the following: color features like as brightness or chromaticity; texture features like as flatness; and block location and neighborhood information.

These features are used to rank the importance of the previously detected block artifacts according to human visual perception. A feature-based blockiness artifact classifier can either eliminate the artifacts previously detected (low visual impact) or strengthen their relative importance in the blockiness artifact map (high visual impact). In an embodiment, the blockiness artifact map includes a binary map image that denotes whether or not an artifact is present in each block of a picture. In an embodiment, the blockiness map can also include a multi-valued map that indicates the strength of the artifact of each block in a picture.

Feature detection could be performed on the luma and/or chroma components of the original picture. In scenarios where the original picture is not available, the feature detection could be performed on the reconstructed picture. In the following sections, we describe how three features could be used in accordance with the present principles. These features are color, texture, and location. Of course, the present principles are not limited solely to use with these features and, thus, other features could also be used, while maintaining the spirit of the present principles.

With respect to color features, the following exemplary color features will be described: bright and dark luma masking; intermediate luma tone determination; and skin color detection.

With respect to bright and dark luma masking, according to the human visual model, block artifacts in darker areas are not perceived as artifacts in areas with mid-tones. For this reason, image segmentation is performed to determine these regions, so that artifacts detected in these regions can be automatically eliminated by using luma features. The two regions are specified by using luma and chroma threshold as follows:

$$\text{dark\_luma} = \begin{cases} 1, & 0 \leq \overline{L} \leq THL_1, \ 0 \leq \overline{U} \leq THU_1, \ 0 \leq \overline{V} \leq THV_1 \\ 0, & \text{else} \end{cases} \quad (8)$$

$$\text{bright\_luma} = \begin{cases} 1, & \overline{L} \geq THL_2, \ \overline{U} \geq THU_2, \ \overline{V} \geq THV_2 \\ 0, & \text{else} \end{cases} \quad (9)$$

where $\overline{L}$, $\overline{U}$ and $\overline{V}$ are the average luma and chroma values per block. It is to be noted that typically, luma is represented by Y (with respect YUV color space). The luma and chroma values can be thresholded in pixel level as well. The thresholds ($THL_1$, $THU_1$, $THV_1$, $THL_2$, $THU_2$, $THV_2$) can be derived by using training video data. The reason for including chroma values is some video content might have a low luma value. However, if the video content has high chroma component, then artifacts still remain visible.

With respect to intermediate luma tone determination, block artifacts in intermediate gray level tones have different visibility. For this reason, image segmentation is performed to determine different luma tones so that artifacts detected in different luma regions can be strengthened or eliminated accordingly. The intermediate luma tones can be classified in different levels. In an embodiment, 3 mid-level tones can be detected. Two regions are specified by using luma and chroma thresholds. Luma levels can be determined as follows:

$$\text{luma\_levels} = \begin{cases} \text{low\_luma}, & THL_{m1} \leq \overline{L} \leq THL_{m2} \\ \text{medium\_luma}, & THL_{m3} \leq \overline{L} \leq THL_{m4} \\ \text{high\_luma}, & THL_{m5} \leq \overline{L} \leq THL_{m6} \end{cases} \quad (10)$$

where $\overline{L}$ represents the average luma and chroma values per block. The thresholds ($THL_{m1}$, $THL_{m2}$, $THL_{m3}$, $THL_{m4}$, $THL_{m5}$, $THL_{m6}$) can be derived using training video data.

With respect to skin color detection, some regions such as faces are more important to human eyes. Thus, artifacts on these areas become more visible. To address the importance of these areas in artifact detection, we use a threshold based approach to detect the skin tones. It is to be appreciated that this method is but one embodiment, and thus, the present principles are not limited to only this skin detection method. Accordingly, other skin detection methods can be used, while maintaining the spirit of the present principles. The blocks are classified as skin and non-skin color using, for example, the following calculation:

$$\text{skin\_color} = \begin{cases} 1, & \begin{array}{l} LowLimU \leq \text{chroma\_u} \leq UpLimU, \\ LowLimV \leq \text{chroma\_v} \leq UpLimV \end{array} \\ 0, & \text{else} \end{cases} \quad (11)$$

The thresholds (LowLimU, UpLimU, LowLimV, UpLimV) can be derived using training video data.

With respect to texture features, the texture characteristic of an image block is another feature that can be used to refine block artifact detection in accordance with the present principles. If blockiness occurs in an area with texture, then the human vision system is less likely to notice the blockiness than if the blockiness occurred in a smooth area. The texture versus smooth area classification can be performed by different methods. In an embodiment, the number and magnitude of the transform coefficients in the lower diagonal of the transform array is analyzed. If the number and magnitude exceeds a certain value, the block is declared as texture block. Similarly, if the magnitude and number of non-zero coefficients are within a certain value, the block is declared as a flat area. In another embodiment, the texture classification can be done by using the variance of the block.

Figure 6A:
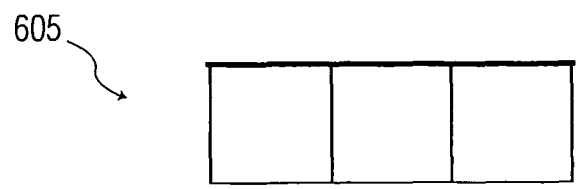
FIGS. 6A-L are diagrams for exemplary directional processing examples of image blocks, in accordance with an embodiment of the present principles.
Figure 6B:
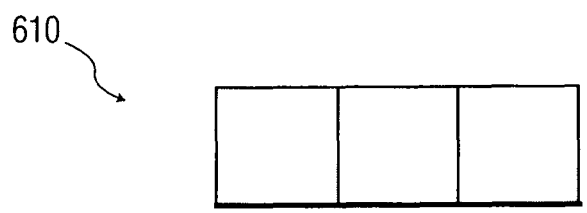
Figure 6C:
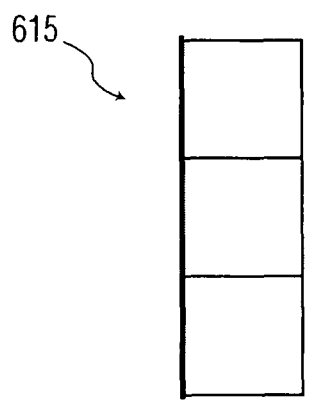
Figure 6D:
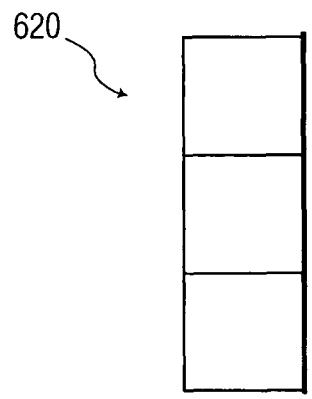
Figure 6E:
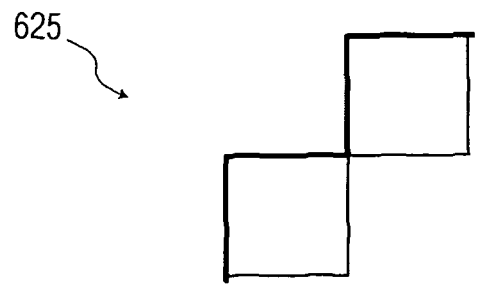
Figure 6F:
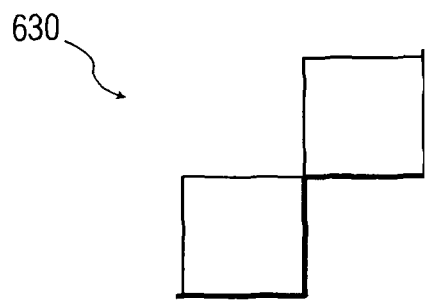
Figure 6G:
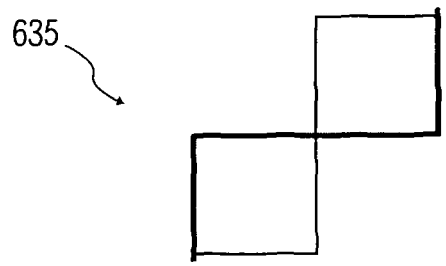
Figure 6H:
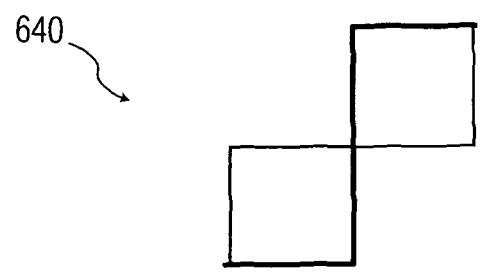
Figure 6I:
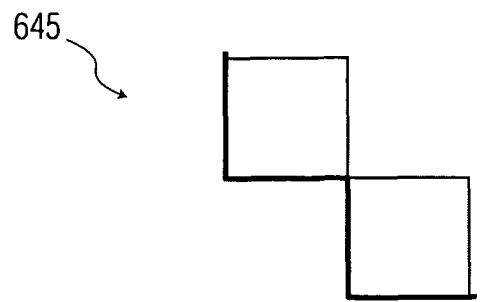
Figure 6J:
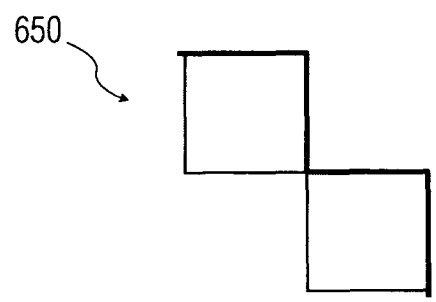
Figure 6K:
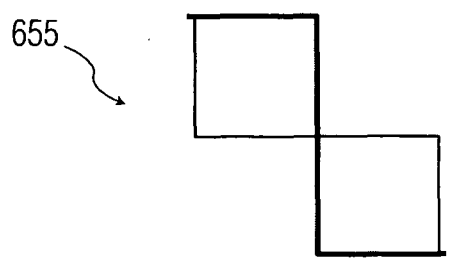
Figure 6L:
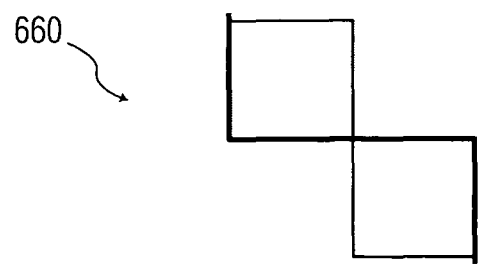

With respect to location and neighborhood features, it is observed that block artifacts become more visible if the blockiness in neighboring macroblocks aligns on the same side of horizontal, vertical and/or diagonal directions. Similarly, the artifacts are less noticeable if they are in isolated blocks. In an embodiment, a proposed refinement scheme eliminates isolated artifacts and keeps those that are concatenated with each other. Turning to FIGS. 6A-L, exemplary directional processing examples of image blocks are respectively indicated by the reference numerals 605, 610, 615, 620, 625, 630, 635, 640, 645, 650, 655, and 660. In particular, FIGS. 6A and 6B and elements 605 and 610 respectively shown therein relate to horizontal processing, FIGS. 6C and 6D and elements 615 and 620 respectively shown therein relate to vertical processing, FIGS. 6E, 6F, 6G, and 6H, and elements 625, 630, 635, and 640 respectively shown therein relate to diagonal processing, and FIGS. 6I, 6J, 6K, and 6L, and elements 645, 650, 655, and 660 respectively shown therein also relate to diagonal processing. Horizontal processing gives emphasis for artifacts that are in North and South directions whereas vertical processing gives emphasis to East and West directions. Diagonal processing is not as straightforward as horizontal and vertical, since different combinations can exist in diagonal directions as shown in FIGS. 6C and 6D. In the example shown in FIGS. 6A-D, the corresponding processing shown involves 2 or 3 blocks. However, it is to be appreciated that the directional processing can be applied to other numbers of blocks including, but not limited to, horizontal processing of 4 consecutive blocks, while maintaining the spirit of the present principles.

Figure 7:
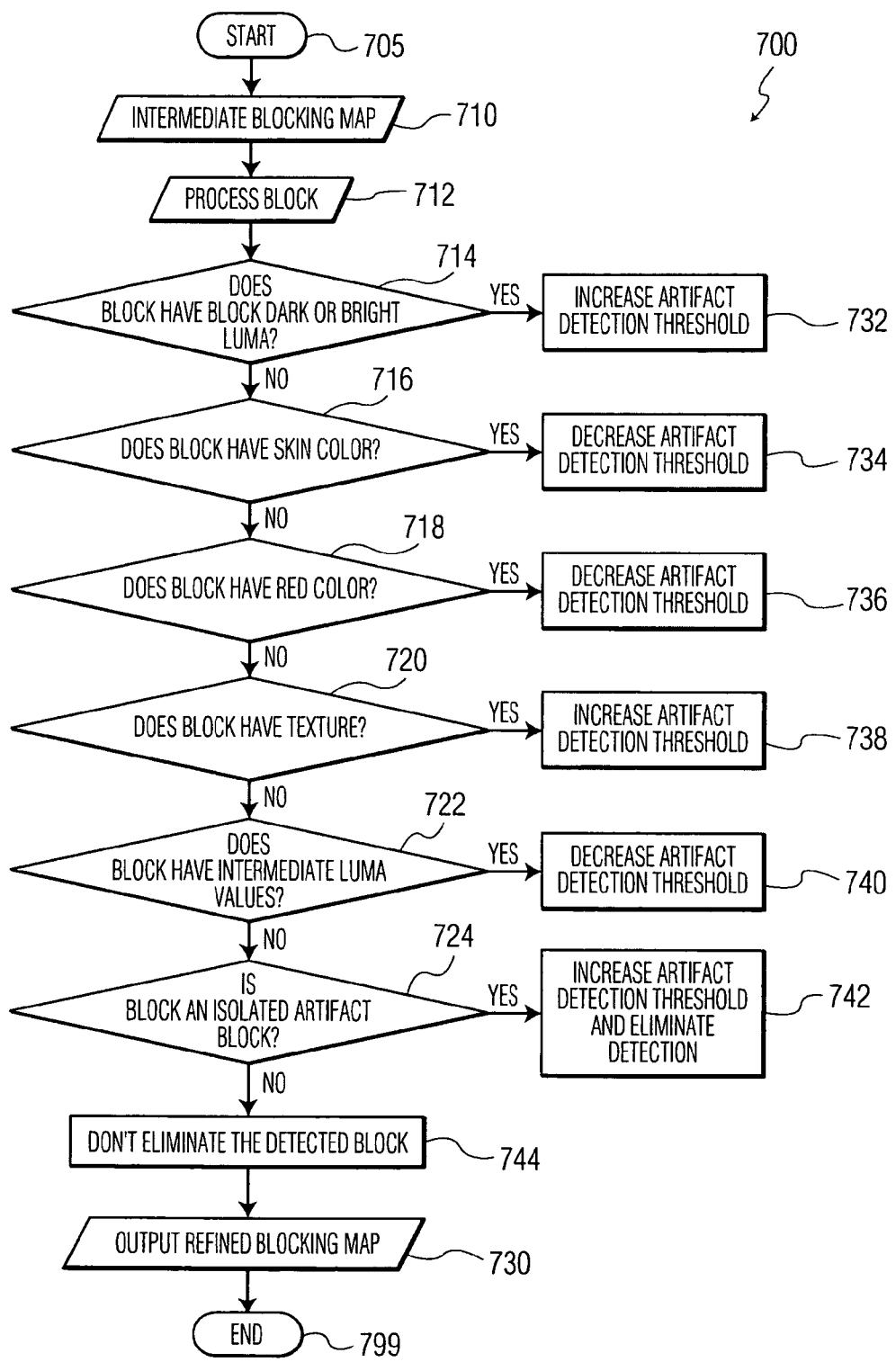
FIG. 7 is a flow diagram for an exemplary method for feature based artifact refinement, in accordance with an embodiment of the present principles.

Turning to FIG. 7, an exemplary method for feature based artifact refinement is indicated generally by the reference numeral 700. It is to be appreciated that the use of the phrase "current block" with respect to the method 700 of FIG. 7 refers to a reconstructed block, as compared to an original block. Moreover, it is to be appreciated that decision block 728 mentioned herein below refers to an original block. Nonetheless, the method 700 of FIG. 7 and, in particular, the blocks described with respect thereto, can be applied to any of an original block and/or a reconstructed block. That is, while some blocks in method 700 refer to a current block and other blocks refer to an original block, implying that the current block is a reconstructed block, such blocks can use any of an original block and/or reconstructed block, while maintaining the spirit of the present principles. Further, it is to be appreciated that one or more of the following decision blocks referred to with respect to the method 700 of FIG. 7 can optionally use one or more thresholds in making the corresponding determinations.

The method 700 includes a start block 705 that passes control to a function block 710. The function block 710 generates and/or inputs an intermediate block map, and passes control to a function block 712. The function block 712 begins processing a current block and passes control to a decision block 714. As used with respect to FIG. 7 "current block" refers to a compressed/processed block and "original block" refers to an uncompressed/non-processed block. The decision block 714 determines whether or not a current block in the intermediate block map has dark or bright luma. If so, then control is passed to a function block 732. Otherwise, control is passed to a decision block 716.

The function block 732 increases the artifact detection threshold.

The decision block 716 determines whether or not the current block includes skin color. If so, then control is passed to a function block 734. Otherwise, control is passed to a decision block 718.

The function block 734 decreases the artifact detection threshold.

The decision block 718 determines whether or not the current block includes the color red. If so, then control is passed to a function block 736. Otherwise, control is passed to a decision block 720.

The function block 736 decreases the artifact detection threshold.

The decision block 720 determines whether or not the current block includes texture. If so, then control is passed to a function block 738. Otherwise, control is passed to a decision block 722.

The function block 738 increases the artifact detection threshold.

The decision block 722 determines whether or not the current block includes intermediate luma values. If so, the control is passed to a function block 740. Otherwise, control is passed to a decision block 724.

The function block 740 decreases the artifact detection threshold.

The decision block 724 determines whether or not the current block is an isolated artifact block. If so, then control is passed to a function block 742. Otherwise, control is passed to a function block 744.

The function block 742 increases the artifact detection threshold and eliminates detection.

The function block 744 keeps (i.e., does not eliminate) the detected block, and passes control to a function block 730.

The decision block 730 refines the block map (generated by function block 710), and passes control to an end block 799.

It is to be appreciated that the respective use of each of the listed features in the method 700 is optional and, thus, for example, one or more additional features could be added and/or one or more specified features could be eliminated, while maintaining the present principles.

Elimination of Incorrect Artifact Detections by the Use of Original Pictures A blockiness artifact map created by any of the methods previously described could be further enhanced by using information from the original pictures, in the case when the original pictures are available. In a particular embodiment, incorrectly detected compression artifacts could be eliminated from the artifact map by computing the artifact map of the original picture. In this case, we propose to use the original picture to eliminate false artifact detections by using the following threshold based method. In pixel domain artifact detection, if the adjusted and filtered pixel difference in the block boundary in the reconstructed image is less than some factor of the adjusted filtered pixel difference in the block boundary of the original image, then that block is declared as not an artifact. Similarly, if the particular transform coefficients of the block in the reconstructed picture are less than some factor of the transform coefficient of the co-located block in the original picture, then the block is declared as not an artifact. It is to be appreciated that edges can be included in the artifact without being real artifacts.

Method and Apparatus for Blockiness Strength Determination

Figure 8:
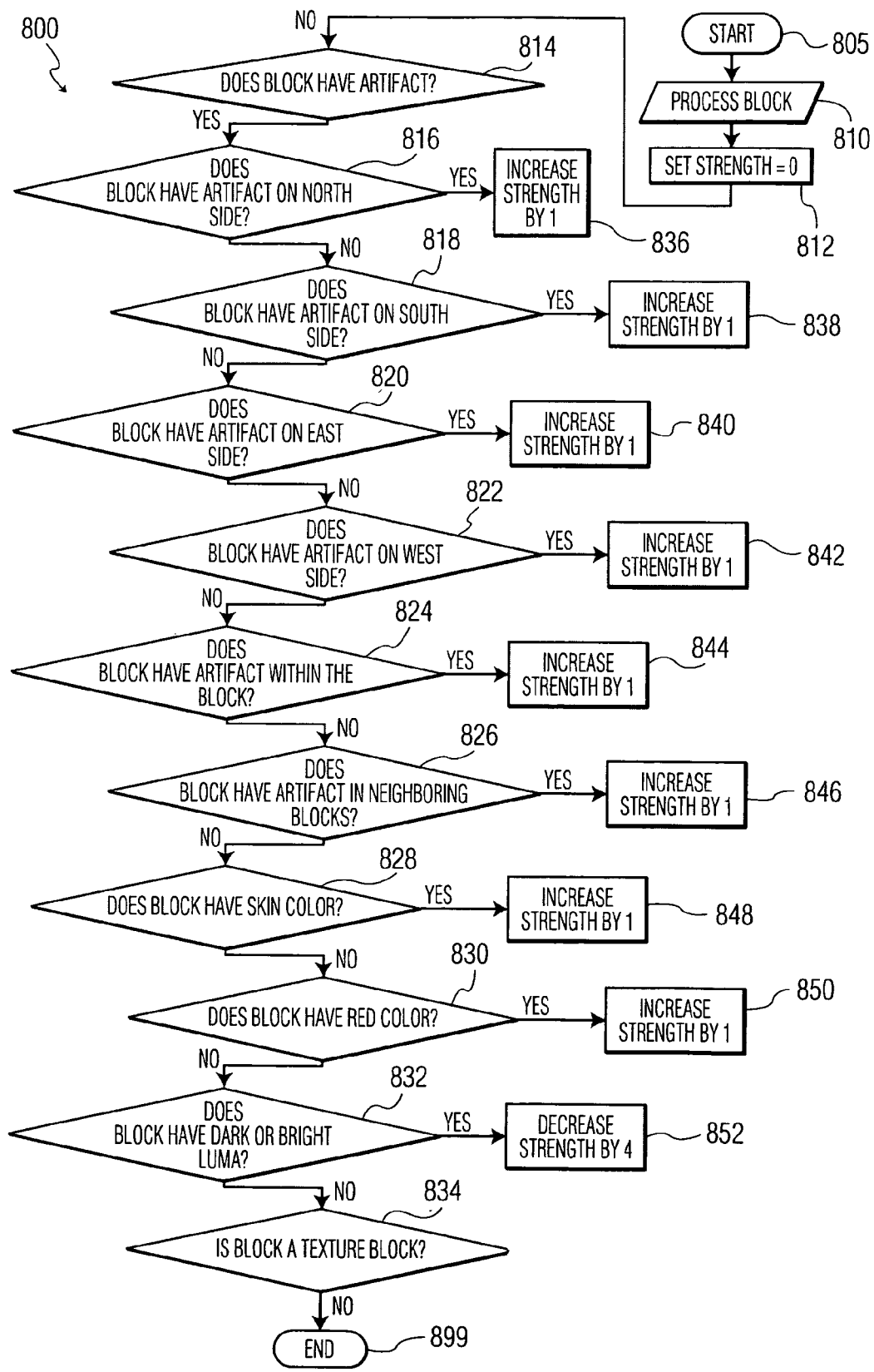
FIG. 8 is a flow diagram for an exemplary method for determining block artifact strength of a picture, in accordance with an embodiment of the present principles.

The blockiness strength determination is especially useful when an application aims at performing block artifact correction. In this particular scenario, the artifact strength could be used to guide the correction algorithm to tune the correction parameters. In an embodiment, artifact strength is determined using perceptual features. Examples of perceptual features have been provided in the previous section (color, texture, location, and so forth, again keeping in mind that the present principles are not limited to solely the mentioned perceptual features). Turning to FIG. 8, an exemplary method for block artifact strength determination is indicated generally by the reference numeral 800. It is to be appreciated that the use of the phrase "current block" with respect to the method 800 of FIG. 8 refers to any of a reconstructed block and/or an original block. That is, the blocks in method 800 can use any of an original block and/or reconstructed block, while maintaining the spirit of the present principles. Further, it is to be appreciated that one or more of the following decision blocks referred to with respect to the method 800 of FIG. 8 can optionally use one or more thresholds in making the corresponding determinations.

The method 800 includes a start block 805 that passes control to a function block 810. The function block 810 processes a current block and passes control to a function block 812. The function block 812 sets the blockiness strength to zero, and passes control to a decision block 814. The decision block 814 determines whether or not the current block has an artifact. If so, then control is passed to a decision block 816. Otherwise, control is passed to an end block 899.

The decision block 816 determines whether or not the current block has an artifact on the North side. If so, then control is passed to a function block 836. Otherwise, control is passed to a decision block 818.

The function block 836 increases the blockiness strength by one (or any other value).

The decision block 818 determines whether or not the current block has an artifact on the South side. If so, then control is passed to a function block 838. Otherwise, control is passed to a decision block 820.

The function block 838 increases the blockiness strength by one (or any other value).

The decision block 820 determines whether or not the current block has an artifact on the East side. If so, the control is passed to a function block 840. Otherwise, control is passed to a decision block 822.

The function block 840 increases the blockiness strength by one (or any other value).

The decision block 822 determines whether or not the current block has an artifact on the West side. If so, then control is passed to a function block 842. Otherwise, control is passed to a decision block 824.

The function block 842 increases the blockiness strength by one (or any other value).

The decision block 824 determines whether or not the current block has an artifact within. If so, then control is passed to a function block 844. Otherwise, control is passed to a decision block 826.

The function block 844 increases the blockiness strength by one (or any other value).

The decision block 826 determines whether or not any neighboring blocks, with respect to the current block, have any artifacts. If so, then control is passed to a function block 846. Otherwise, control is passed to a decision block 828.

The function block 846 increases the blockiness strength by one (or any other value).

The decision block 828 determines whether or not the current block includes skin color. If so, then control is passed to a function block 848. Otherwise, control is passed to a decision block 830.

The function block 848 increases the blockiness strength by one (or any other value).

The decision block 830 determines whether or not the current block includes the color red. If so, then control is passed to a function block 850. Otherwise, control is passed to a decision block 832.

The function block 850 increases the blockiness strength by one (or any other value).

The decision block 832 determines whether or not the current block has dark or bright luma. If so, then control is passed to a function block 852. Otherwise, control is passed to a decision block 834.

The function block 852 decreases the blockiness strength by 4 (or any other value).

The decision block 834 determines whether or not the current block includes texture. If so, then control is passed to a function block 854. Otherwise, control is passed to the end block 899.

The function block 854 decreases the blockiness strength by two (or any other value).

Methods for Picture Level Artifact Detection

Two exemplary methods for picture level artifact detection are proposed herein.

Method 1

In accordance with an embodiment of the first method for picture level detection, the overall blockiness metric is defined by the weighted sum of the adjusted sum of pixel differences. The weights are determined by the features used in the method. In an embodiment, the picture level artifact detection is defined as follows:

$$BM = \sum_{k=1}^{N} \beta_k \sum_{j=E,N,S,W} \alpha_j \Delta_j \quad (12)$$

where $\Delta$ is the adjusted sum of filtered pixel differences given in Equation (5), j is the index that determines the side of the block such as North, East, West, and South and N is the total number of blocks in the picture. $\alpha$ is the weighting factor that is determined by the detected features. $\alpha$ can be expressed as a function of feature parameters. For example, if 4 features are used, then $\alpha$ is expressed as follows:

$$\alpha = f(\kappa_1, \kappa_2, \kappa_3, \kappa_4) \quad (13)$$

where $\kappa_1$, $\kappa_2$, $\kappa_3$, $\kappa_4$ are the feature parameters. In another embodiment, a different number of features can also be used. In one embodiment, the function $f$ that determines the side block weight can be defined as follows:

$$f(\kappa_1, \kappa_2, \kappa_3, \kappa_4) = \kappa_1 \times \kappa_2 \times \kappa_3 \times \kappa_4 \quad (14)$$

The feature parameters $\kappa_1$, $\kappa_2$, $\kappa_3$, $\kappa_4$ can be adjusted according to the strength of the features. $\beta_k$ is the parameter that determines whether or not an artifact is detected in the $k^{th}$ block. $\beta_k$ can be defined as follows:

$$\beta_k = \begin{cases} 1 & \text{if } k^{th} \text{block has artifact} \\ 0 & \text{if } k^{th} \text{block has no artifact} \end{cases} \quad (15)$$

Of course, the present principles are not limited to the preceding weighting of $\beta_k$ and, thus, other weightings of $\beta_k$ can also be used, while maintaining the spirit of the present principles.

Method 2

In accordance with the second method of picture level artifact detection, an overall blockiness metric is defined as the total number of blocks that are determined to have artifacts. The picture level artifact detection is defined as follows:

$$BM = \sum_{k=1}^{N} \gamma_k \times n_k \quad (16)$$

$\gamma_k$ is defined as the strength of block k. $\gamma_k$ takes values in the range of possible strength values. For example, in one embodiment, 4 strength levels can be used, and $\gamma_k$ can be a value from 0 to 4. $n_k$ is defined as follows:

$$n_k = \begin{cases} 1 & \text{if } k^{th} \text{block has artifact} \\ 0 & \text{if } k^{th} \text{block has no artifact} \end{cases} \quad (17)$$

Figure 9:
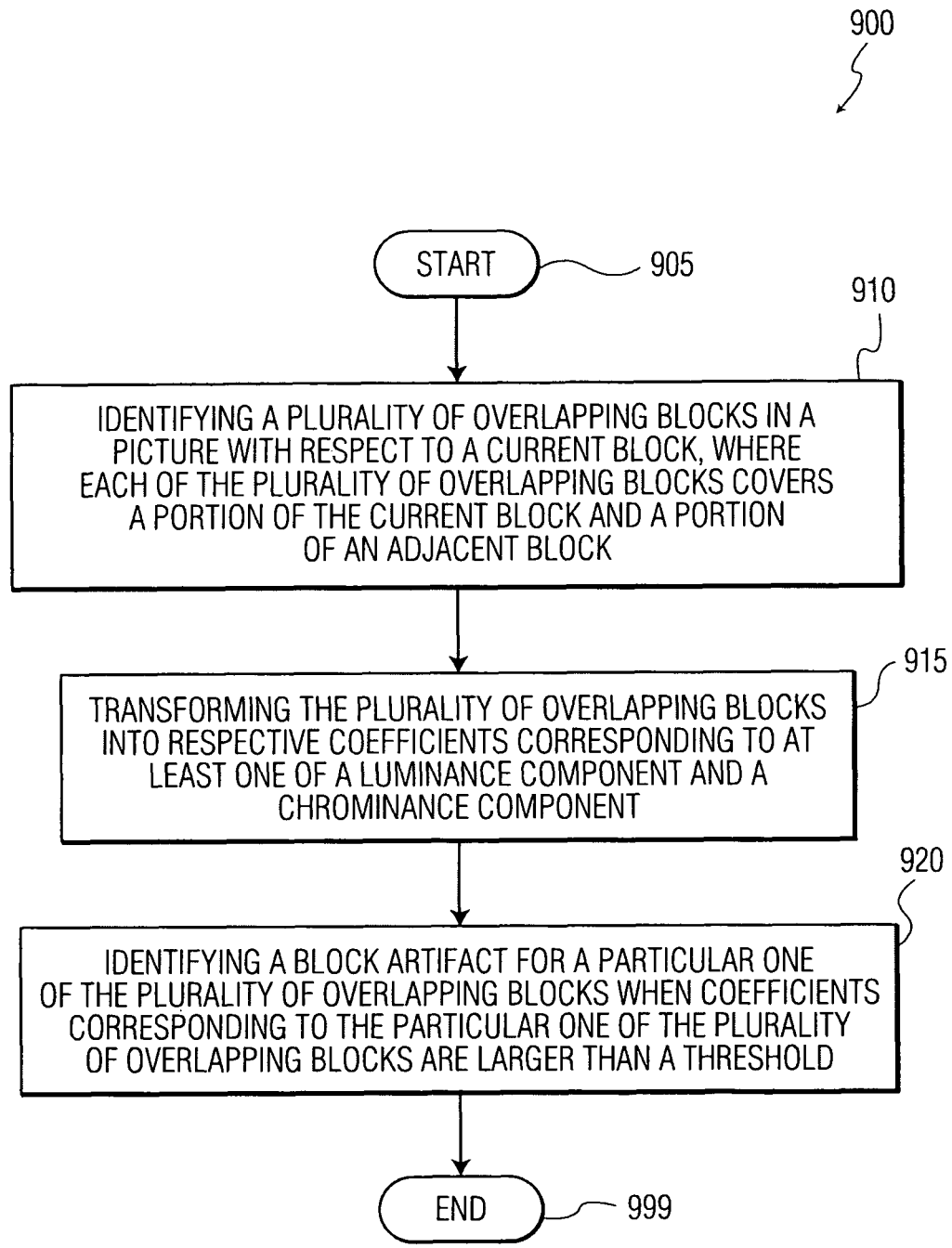
FIG. 9 is a flow diagram for an exemplary method for detecting block artifacts, in accordance with an embodiment of the present principles.

Turning to FIG. 9, an exemplary method for picture level artifact detection is indicated generally by the reference numeral 900.

The method 900 provides an initial output, namely the identification of blocks that include block artifacts, that can be used with respect to other embodiments of the present principles including, but not limited to, the generation of an artifact map, refinement of the map, detection and/or re-evaluation of previous detection based on one or more features, the calculation of artifact strength, and the calculation of an overall blockiness metric for a picture that includes the block.

The method 900 includes a start block 905 that passes control to a function block 910. The function block 910 identifies a plurality of overlapping blocks in a picture with respect to a current block, where each of the plurality of overlapping blocks covers a portion of the current block and a portion of an adjacent block, and passes control to a function block 915. The function block 915 transforms the plurality of overlapping blocks into respective coefficients corresponding to at least one of a luminance component and a chrominance component, and passes control to a function block 920. The function block 920 identifies a block artifact for a particular one of the plurality of overlapping blocks when coefficients corresponding to the particular one of the plurality of overlapping blocks are larger than a threshold value, and passes control to an end block 999.

Figure 10:
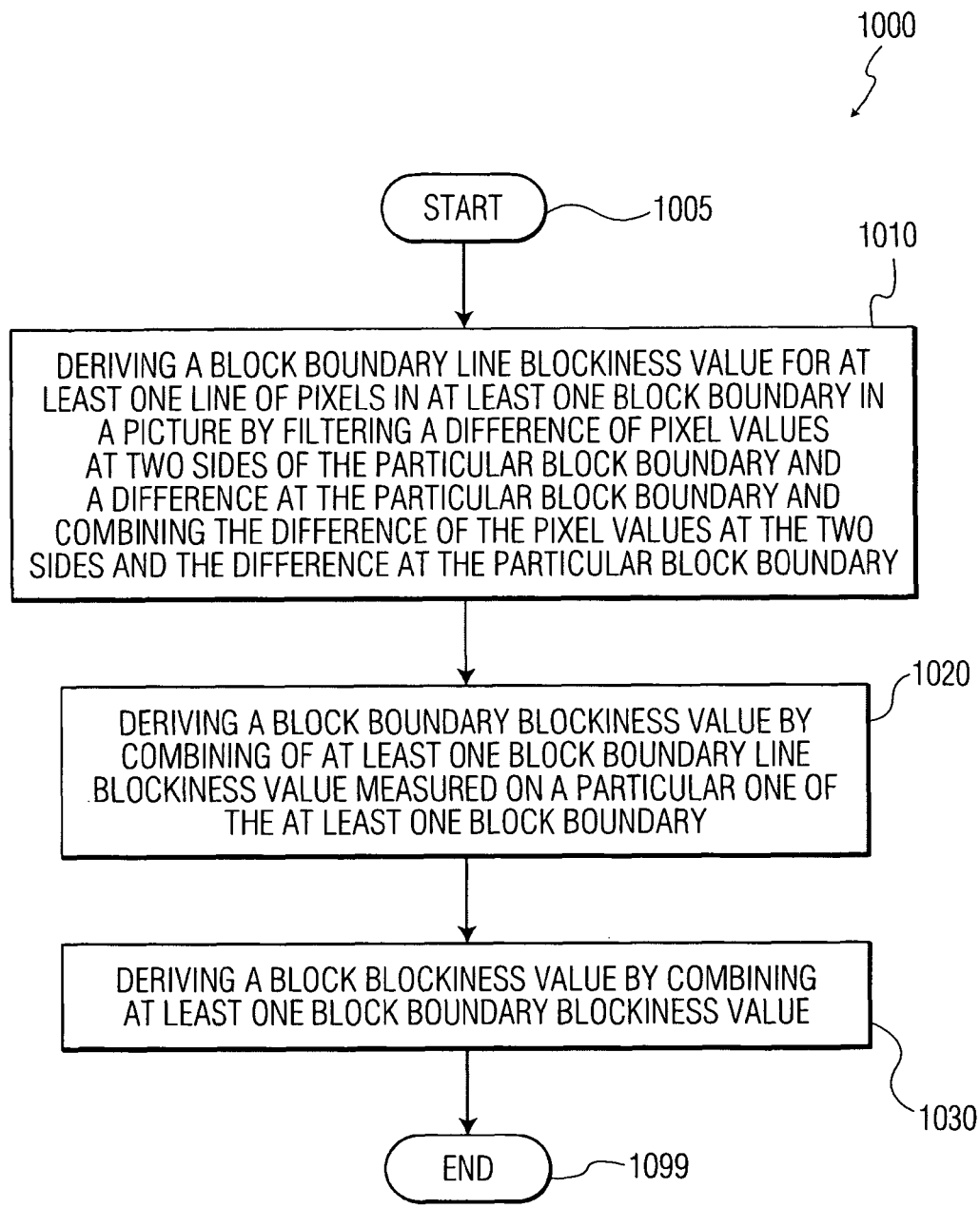
FIG. 10 is a flow diagram for an exemplary method for detecting block artifacts, in accordance with an embodiment of the present principles.

Turning to FIG. 10, an exemplary method for picture level artifact detection is indicated generally by the reference numeral 1000.

The method 1000 provides an initial output, namely the identification of blocks that include block artifacts, that can be used with respect to other embodiments of the present principles including, but not limited to, the generation of an artifact map, refinement of the map, detection and/or re-evaluation of previous detection based on one or more features, the calculation of artifact strength, and the calculation of an overall blockiness metric for a picture that includes the block.

The method 1000 includes a start block 1005 that passes control to a function block 1010. The function block 1010 derives a block boundary line blockiness value for at least one line of pixels in at least one block boundary by filtering a difference of pixel values at two sides of the particular block boundary and a difference at the particular block boundary and combining the difference of the pixel values at the two sides and the difference at the particular block boundary, and passes control to a function 1020. The function block 1020 derives a block boundary blockiness value by combining of at least one block boundary line blockiness value measured on a particular one of the at least one block boundary, and passes control to a function block 1030. The function block 1030 derives a block blockiness value by combining at least one block boundary blockiness value, and passes control to an end block 1099.

A description will now be given of some of the many attendant advantages/features of the present invention, some of which have been mentioned above. For example, one advantage/feature is a method for detecting block artifacts. The method includes identifying a plurality of overlapping blocks in a picture with respect to a current block. Each of the plurality of overlapping blocks covers a portion of the current block and a portion of an adjacent block. The method further includes transforming at least one of the plurality of overlapping blocks into respective coefficients corresponding to at least one of a luminance component and a chrominance component. The method also includes identifying a block artifact for the at least one of the plurality of overlapping blocks when coefficients corresponding to the at least one of the plurality of overlapping blocks are larger than a predefined value.

Another advantage/feature is the method as described above, wherein the step of identifying the block artifact respectively uses at least one threshold as the predefined value to determine whether the block artifact exists within the at least one of the overlapping blocks and a possible direction of the block artifact with respect to the current block.

Yet another advantage/feature is the method as described above, wherein the method further includes calculating an overall blockiness metric for the picture based on a total number of overlapping blocks in the picture that have the block artifact.

Still another advantage/feature is the method as described above, wherein the method further includes generating a blockiness artifact map that specifies a location of the block artifact in the picture.

Moreover, another advantage/feature is the method as described above, wherein the method further includes performing feature detection on at least one of an original version of a reconstructed version of the picture, and performing feature based artifact correction on the blockiness artifact map to generate a feature-enhanced blockiness artifact map.

Further, another advantage/feature is the method as described above, wherein the step of identifying the block artifact further includes eliminating false identification of the block artifact when an adjusted and filtered pixel difference at a block boundary corresponding to the identified block artifacts in a reconstructed version of the picture is less than, by a pre-specified amount, an adjusted filtered pixel difference in the block boundary corresponding to the identified block artifact in an original version of the picture.

Also, another advantage/feature is the method as described above, wherein the step of identifying the block artifact further includes eliminating false identification of the block artifact when the transform coefficients of the particular one of the plurality of overlapping blocks in a reconstructed version of the picture is less than, by a pre-specified amount, the transform coefficients of a co-located block for the particular one of the plurality of overlapping blocks in an original version of the picture.

In addition, another advantage/feature is a method for detecting block artifacts. The method includes deriving a block boundary line blockiness value for at least one line of pixels in at least one block boundary in a picture by filtering a difference of pixel values at two sides of the particular block boundary and a difference at the particular block boundary and combining the difference of the pixel values at the two sides and the difference at the particular block boundary. The method further includes deriving a block boundary blockiness value by combining of at least one block boundary line blockiness value measured on a particular one of the at least one block boundary. The method also includes deriving a block blockiness value by combining at least one block boundary blockiness value.

Moreover, another advantage/feature is the method as described above, wherein the method further includes calculating an overall picture level block artifact detection value for the picture based on a weighted result of the combining step. A weighting factor is determined based on a set of detected features in the picture.

Further, another advantage/feature is the method as described above, wherein a block artifact is identified based on the block blockiness value, and the method further includes generating a blockiness artifact map that specifies a location of the block artifact in the picture. The method also includes performing feature detection on at least one of an original version of a reconstructed version of the picture, and performing feature based artifact correction on the blockiness artifact map to generate a feature-enhanced blockiness artifact map.

Also, another advantage/feature is the method as described above, wherein the feature detection involves at least one of brightness, chromaticity, skin color, texture, location, and neighborhood information.

Additionally, another advantage/feature is the method as described above, wherein the method further includes refining the feature-enhanced blockiness artifact map based on an original version of the picture.

Moreover, another advantage/feature is the method as described above, wherein the method further includes calculating an artifact strength of the block artifact.

These and other features and advantages of the present principles can be readily ascertained by one of ordinary skill in the pertinent art based on the teachings herein. It is to be understood that the teachings of the present principles can be implemented in various forms of hardware, software, firmware, special purpose processors, or combinations thereof.

Most preferably, the teachings of the present principles are implemented as a combination of hardware and software. Moreover, the software can be implemented as an application program tangibly embodied on a program storage unit. The application program can be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform can also include an operating system and microinstruction code. The various processes and functions described herein can be either part of the microinstruction code or part of the application program, or any combination thereof, which can be executed by a CPU. In addition, various other peripheral units can be connected to the computer platform such as an additional data storage unit and a printing unit.

It is to be further understood that, because some of the constituent system components and methods depicted in the accompanying drawings are preferably implemented in software, the actual connections between the system components or the process function blocks can differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications can be effected therein by one of ordinary skill in the pertinent art without departing from the scope or spirit of the present principles. All such changes and modifications are intended to be included within the scope of the present principles as set forth in the appended claims.

The invention claimed is:

1. A method for detecting block artifacts, comprising:
   identifying a plurality of overlapping blocks in a picture from a sequence of moving video pictures with respect to a current block, where each one of said plurality of overlapping blocks covers a portion of the current block and a portion of an adjacent block;
   transforming at least one of the plurality of overlapping blocks into respective transform coefficients corresponding to at least one of a luminance component and a chrominance component;
   identifying a block artifact for the at least one of the plurality of overlapping blocks when a coefficient of said respective transform coefficients corresponding to the at least one of the plurality of overlapping blocks is larger than a value;
   determining a blockiness value for a block boundary between a first block and a second block in the picture, including:
      accessing lines of pixels, each of the lines of pixels having pixels from the first block and the second block,
      determining a respective filtered value for each of the lines of pixels, and
      determining the blockiness value for the block boundary in response to the filtered values, the determining the blockiness value excluding a minimum or a maximum of the filtered values; and
   determining an artifact strength of the block artifact responsive to at least one of the identifying a block artifact and the determined blockiness value.

2. The method of claim 1, wherein said step of identifying the block artifact uses at least one threshold as said value to determine whether the block artifact exists within said at least one of the overlapping blocks and a direction of the block artifact with respect to the current block.

3. The method of claim 1, further comprising generating an overall blockiness metric for the picture based on a number of overlapping blocks in the picture that have the block artifact.

4. The method of claim 3, wherein said number of overlapping blocks is determined from a total number of overlapping blocks in said picture that have the block artifact.

5. The method of claim 1, further comprising generating a blockiness artifact map that specifies a location of the block artifact in the picture.

6. The method of claim 5, further comprising:
performing feature detection on a reconstructed version of the picture; and
performing feature based artifact correction on the blockiness artifact map to generate a feature-enhanced blockiness artifact map.

7. The method of claim 1, wherein said step of identifying the block artifact further comprises the step of eliminating a false identification of the block artifact.

8. The method of claim 7, wherein said eliminating step is performed when an adjusted and filtered pixel difference at a block boundary corresponding to the identified block artifact in a reconstructed version of the picture is less than, by an amount, an adjusted filtered pixel difference in the block boundary corresponding to the identified block artifact in an original version of the picture.

9. The method of claim 7, wherein said eliminating step is performed when the transform coefficients of a particular one of the plurality of overlapping blocks in a reconstructed version of the picture is less than, by an amount, the transform coefficients of a co-located block for the particular one of the plurality of overlapping blocks in an original version of the picture.

10. The method of claim 1, further comprising calculating an overall picture level block artifact detection value for the picture based on a weighted result of said blockiness value for the block boundary, wherein a weighting factor is determined based on at least one detected feature in the picture.

11. The method of claim 10, wherein the feature detection involves at least one of the following features comprising: brightness, chromaticity, skin color, texture, location, and neighborhood information.

12. An apparatus for detecting block artifacts, comprising:
a transform domain artifact detector configured to
identify a plurality of overlapping blocks in a picture from a sequence of moving video pictures with respect to a current block, where each one of said plurality of overlapping blocks covers a portion of the current block and a portion of an adjacent block,
transform at least one of the plurality of overlapping blocks into respective transform coefficients corresponding to at least one of a luminance component and a chrominance component, and
identify a block artifact for the at least one of the plurality of overlapping blocks when a coefficient of said respective transform coefficients corresponding to the at least one of the plurality of overlapping blocks is larger than a value;
a pixel domain artifact detector for determining a blockiness value for a block boundary between a first block and a second block in the picture configured to
access lines of pixels, each of the lines of pixels having pixels from the first block and the second block,
determine a respective filtered value for each of the lines of pixels, and
determine a blockiness value for the block boundary in response to the filtered values, excluding a minimum or a maximum of the filtered values; and
an artifact strength determiner and metric assigner configured to calculate an artifact strength of the block artifact responsive to at least one of the identification of the block artifact and the determined blockiness value.

13. The apparatus of claim 12, wherein the transform domain artifact detector uses at least one threshold as said value to determine whether the block artifact exists within said at least one of the overlapping blocks and a direction of the block artifact with respect to the current block.

14. The apparatus of claim 12, wherein the artifact strength determiner and metric assigner generates an overall blockiness metric for the picture based on a number of overlapping blocks in the picture that have the block artifact.

15. The apparatus of claim 14, wherein said number of overlapping blocks is determined from a total number of overlapping blocks in said picture that have the block artifact.

16. The apparatus of claim 12, further comprising a merger module configured to generate a blockiness artifact map that specifies a location of the block artifact in the picture.

17. The apparatus of claim 16, further comprising:
a feature detector configured to perform feature detection on a reconstructed version of the picture; and
a feature based artifact classifier configured to perform feature based artifact correction on the blockiness artifact map to generate a feature-enhanced blockiness artifact map.

18. The apparatus of claim 12, further comprising:
an artifact map refiner configured to eliminate a false identification of the block artifact.

19. The apparatus of claim 18, wherein said artifact map refiner is configured to eliminate the false identification of the block artifact when an adjusted and filtered pixel difference at a block boundary corresponding to the identified block artifact in a reconstructed version of the picture is less than, by an amount, an adjusted filtered pixel difference in the block boundary corresponding to the identified block artifact in an original version of the picture.

20. The apparatus of claim 18, wherein said artifact map refiner is configured to eliminate the false identification of the block artifact when the transform coefficients of a particular one of the plurality of overlapping blocks in a reconstructed version of the picture is less than, by an amount, the transform coefficients of a co-located block for the particular one of the plurality of overlapping blocks in an original version of the picture.

21. The apparatus of claim 12, wherein said artifact strength determiner and metric assigner are configured to calculate an overall picture level block artifact detection value for the picture based on a weighted result of said blockiness value for the block boundary, wherein a weighting factor is determined based on at least one detected feature in the picture.

22. The apparatus of claim 21, wherein the feature detection involves at least one of the following features comprising: brightness, chromaticity, skin color, texture, location, and neighborhood information.

* * * * *